United States Patent
Yang et al.

(10) Patent No.: US 9,423,669 B2
(45) Date of Patent: Aug. 23, 2016

(54) METHOD AND APPARATUS FOR CAMERA AUTOFOCUS BASED ON WI-FI RANGING TECHNIQUE

(71) Applicant: QUALCOMM Incorporated, San Diego, CA (US)

(72) Inventors: Ruiduo Yang, San Diego, CA (US); Xinzhou Wu, Hillsborough, NJ (US); Feng Guo, San Diego, CA (US); Ning Bi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/532,937

(22) Filed: Nov. 4, 2014

(65) Prior Publication Data

US 2016/0124288 A1   May 5, 2016

(51) Int. Cl.
*G03B 13/36* (2006.01)
*H04N 5/232* (2006.01)
*H04W 64/00* (2009.01)

(52) U.S. Cl.
CPC .......... *G03B 13/36* (2013.01); *H04N 5/23206* (2013.01); *H04N 5/23212* (2013.01); *H04W 64/003* (2013.01)

(58) Field of Classification Search
None
See application file for complete search history.

(56) References Cited

U.S. PATENT DOCUMENTS

| 5,465,144 | A | 11/1995 | Parker et al. |
| 7,317,872 | B1 | 1/2008 | Posa et al. |
| 2008/0316324 | A1 | 12/2008 | Rofougaran et al. |
| 2010/0311347 | A1 | 12/2010 | Le Thierry D'ennequin et al. |
| 2012/0120266 | A1 | 5/2012 | Kang et al. |
| 2012/0249802 | A1 | 10/2012 | Taylor |
| 2014/0362255 | A1* | 12/2014 | Kuang ............... H04N 5/23293 348/231.5 |
| 2015/0138427 | A1* | 5/2015 | Kennedy ............ H04N 5/23206 348/345 |
| 2015/0193664 | A1* | 7/2015 | Marti ................. G06K 9/00845 382/103 |

FOREIGN PATENT DOCUMENTS

| JP | S63117283 A | 5/1988 |
| WO | WO-2014119142 A1 | 8/2014 |

OTHER PUBLICATIONS

International search report and written opinion—PCT/US2015/054009—ISA/EPO—Jan. 4, 2016.
Lanzisera S., et al., "Radio Frequency Time-of-Flight Distance Measurement for Low-Cost Wireless Sensor Localization", IEEE Sensors Journal, IEEE Service Center, New York, NY, US, vol. 11, No. 3, Mar. 1, 2011, pp. 837-845, XP011329384, ISSN: 1530-437X, DOI: 10.1109/JSEN.2010.2072496.

* cited by examiner

*Primary Examiner* — Twyler Haskins
*Assistant Examiner* — Angel L Garces-Rivera
(74) *Attorney, Agent, or Firm* — Knobbe, Martens, Olson & Bear LLP (57) ABSTRACT

Methods and apparatus for capturing an image using an automatic focus are disclosed herein. In one aspect, a method is disclosed which includes communicating, using a camera, with a wireless device via a wireless communication network. The method further includes determining a distance between the camera and the wireless device using the wireless communication network and adjusting a focus of the camera based upon the determined distance. Finally, the method includes capturing an image using the adjusted focus of the camera. In some aspects, this method may be done on a smartphone or digital camera which includes Wi-Fi capabilities.

30 Claims, 5 Drawing Sheets

FIG. 4

METHOD AND APPARATUS FOR CAMERA AUTOFOCUS BASED ON WI-FI RANGING TECHNIQUE

BACKGROUND

1. Field

The present application relates generally to systems and methods for autofocus for a camera, and more specifically to systems, methods, and devices for using Wi-Fi to improve autofocus for a camera.

2. Description of the Related Art

A number of different techniques are available in the art for providing automatic focus (autofocus) capabilities for a digital camera. For example, various autofocus techniques may be based upon determining the sharpness of the image and adjusting a focus of the lenses based on this sharpness. These techniques may be referred to as passive autofocus techniques, as they do not require interacting with the object in any way. Active techniques, for example, using various methods to determine the distance to a remote object, may also be used. Different techniques may have certain benefits and drawbacks. For example, the active techniques may be more accurate and perform faster, but may require more processing and may require additional components. Further, both techniques may fail to focus on a correct object in scenes with a large number of objects at various distances. Accordingly, improved techniques for camera autofocus are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In one aspect, a method of capturing an image using an automatic focus is described. The method includes communicating, using a camera, with a wireless device via a wireless communication network, determining a distance between the camera and the wireless device using the wireless communication network, adjusting a focus of the camera based upon the determined distance, and capturing an image using the adjusted focus of the camera.

In some aspects, the wireless communication network may include a network operating under one or more IEEE 802.11 standard and/or a peer-to-peer wireless communication network. The wireless device may include a mobile device worn by a person that is a subject of the image, and may be a wireless device that the camera is configured to identify and communicate with. The method described herein may also include determining a direction from the camera to the wireless device, using the wireless communication network, and determining if the wireless device is within a field of view of the camera, based at least on the determined direction. In some aspects, determining a distance between the camera and the wireless device may include determining a distance between the camera and the wireless device to a precision of about 1 meter. In some aspects, capturing an image using the adjusted focus of the camera may include capturing a video, comprising a plurality of images, using the adjusted focus of the camera.

One aspect of the present disclosure provides an apparatus for capturing an image using an automatic focus, including a camera configured to capture one or more images. The apparatus further includes a processing system configured to communicate with a wireless device via a wireless communication network, determine a distance between the camera and the wireless device using the wireless communication network, adjust a focus of the camera based upon the determined distance, and capture an image with the camera using the adjusted focus.

In one aspect, the present disclosure provides an apparatus for capturing an image using an automatic focus, including means for communicating, using a camera, with a wireless device via a wireless communication network, means for determining a distance between the camera and the wireless device using the wireless communication network, means for adjusting a focus of the camera based upon the determined distance, and means for capturing an image using the adjusted focus of the camera.

One aspect of the present disclosure provides a non-transitory computer-readable medium comprising code that, when executed, causes an apparatus to communicate, using a camera, with a wireless device via a wireless communication network. The code further causes an apparatus to determine a distance between the camera and the wireless device using the wireless communication network, adjust a focus of the camera based upon the determined distance, and capture an image using the adjusted focus of the camera.

DETAILED DESCRIPTION

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Modern camera equipment, including digital cameras, for example, digital single-lens reflex (DSLR) cameras, mobile phone cameras, mirror-less cameras, and other cameras include an autofocus mode. This mode allows a camera to focus on one or more objects in a scene automatically, without requiring that a user manually adjust lenses and settings. Various techniques are available to provide a camera with autofocus capabilities. Generally, these techniques may be broken up into two categories, passive autofocus techniques and active autofocus techniques.

Passive autofocus techniques may be defined as autofocus methods which adjust a focus of the camera based on sharpness of a received image. For example, an image may be received by a camera, and may be analyzed using a processor or other means. This analysis may be used to determine the sharpness of the image, for example, determining the sharpness of the image based on the rate of variation in color and brightness between adjacent pixels of the image. Based on this determination of whether an image is sharp or not, the focus of the camera may be adjusted in order to adjust the sharpness of the image. After the focus of the camera has been adjusted, the sharpness of the image may again be determined, in an iterative process until the image has obtained a desired level of sharpness, for example, based on a threshold value. In some aspects, this iterative technique may be relatively slow. Generally, because of the iterative nature of this technique, the sharpness of an image may be increased by taking more time (doing more iterations) to focus. However, this presents a trade-off, as in many case, a user may desire a fast autofocus time in order to capture, for example, moving objects and transitory scenes.

Active autofocus techniques may describe various methods to determine a distance to an object in a scene, and to adjust the focus of the camera based on this distance. For example, active autofocus techniques may use stereo images, ultrasound, time of flight, or other techniques to determine a distance to an object in order to focus the camera. Based on this determined distance, the focus of the camera may be adjusted, for example, by adjusting lenses within the camera in order to bring into focus objects which are the determined distance away.

In general, active techniques may offer a number of advantages over passive techniques. Active techniques may operate more quickly than passive techniques, as an active technique may be able to determine a distance and then adjust the focus of the camera in a single step, a single time. In contrast, certain passive techniques may require, for example, calculating a sharpness of an image, adjusting a focus of the camera, calculating another sharpness of the image, and so on in an iterative process. Due to the iterative nature of this process, it may occur multiple times. Each time the focus of the camera is adjusted, and each time a sharpness of a received image is determined may take some amount of time. Accordingly, passive techniques may often take more time than active techniques in order to focus an image. Further, because active autofocus techniques directly determine a distance to an object, these techniques may also perform better than passive autofocus techniques, which may be limited by the number of times the focus can be iteratively improved before the autofocus takes too long to be useful.

Wi-Fi Networks and Devices

Wireless network technologies can include various types of wireless local area networks (WLANs). A WLAN can be used to interconnect nearby devices together, employing widely used networking protocols. The various aspects described herein can apply to any communication standard, for example, Wi-Fi or, more generally, any member of the IEEE 802.11 family of wireless protocols, for example, IEEE 802.11mc.

In some aspects, wireless signals can be transmitted according to a high-efficiency 802.11 protocol using orthogonal frequency-division multiplexing (OFDM), direct sequence spread spectrum (DSSS) communications, a combination of OFDM and DSSS communications, or other schemes.

In some implementations, a WLAN may include various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In some implementations an STA can also be used as an AP. Certain implementations may also include peer-to-peer communications, wherein communications are made directly between two devices, without going through an AP.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal. An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 1:
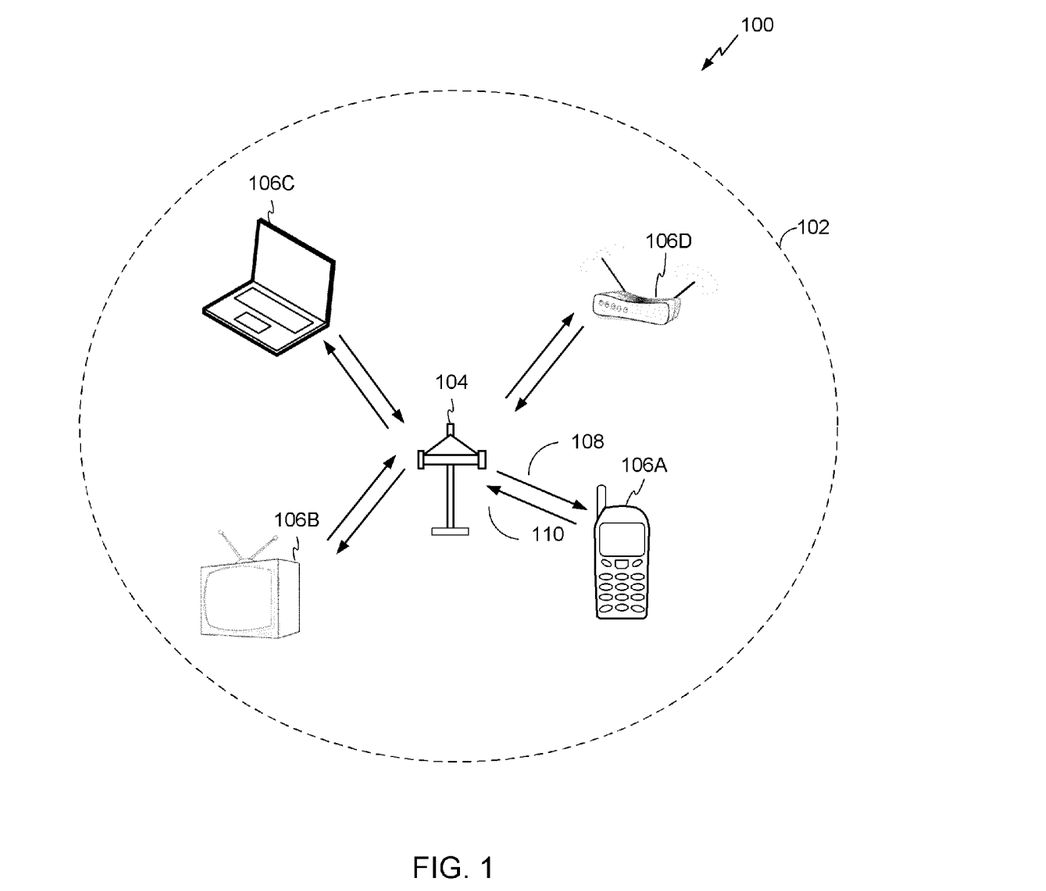
FIG. 1 illustrates an example of a wireless communication system 100 in which aspects of the present disclosure can be employed.

FIG. 1 illustrates an example of a wireless communication system 100 in which aspects of the present disclosure can be employed. The wireless communication system 100 can operate pursuant to a wireless standard, for example the 802.11mc standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDMA techniques. If this is the case, the wireless communication system 100 can be referred to as an OFDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106. In some aspects of the present disclosure, the AP 104 may also have an allocation signaling controller 135. As explained in more detail below, such a controller may be configured to allocate a bandwidth into a number of minimum allocations, to identify one or more devices that may be assigned allocations in a transmission (either uplink or downlink), and to transmit information to those one or more devices, signaling their allocation to those devices.

Figure 2:
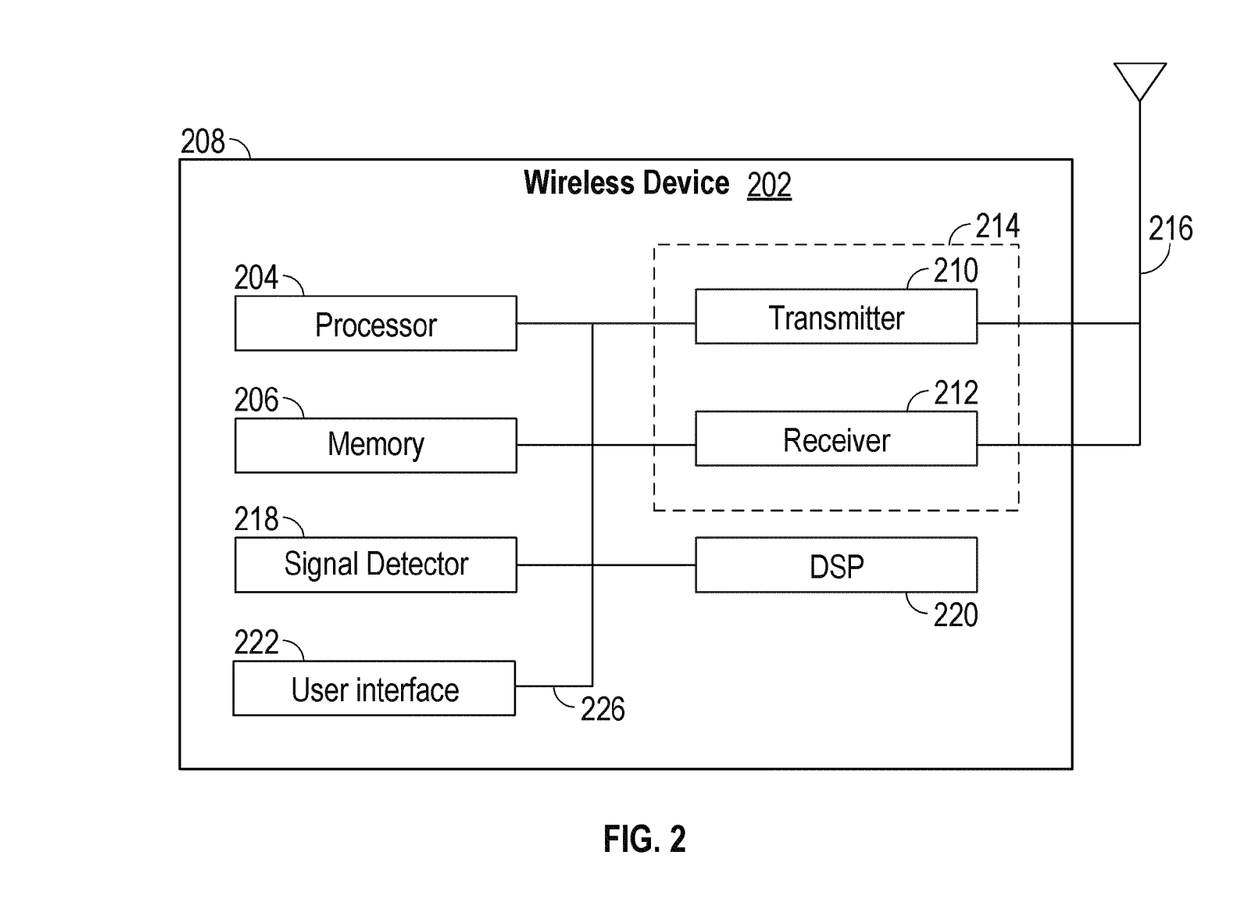
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Wi-Fi Autofocus

Certain versions of Wi-Fi, based on the IEEE 802.11 family of protocols, include the ability to estimate a distance between two devices on a network. For example, IEEE 802.11mc defines network management protocols for fine timing measurement, which can be used to obtain accurate estimates of distance between two devices on a network, so that those devices may communicate with each other. The accuracy of these measurements largely depends upon a channel bandwidth of the communication. With certain Wi-Fi chipsets, 80 MHz and 160 MHz bandwidths may be used for communications. With these bandwidths, distances may be estimated with an accuracy of approximately one meter. In addition to being used to estimate distance, certain MIMO (multiple-input, multiple-output) Wi-Fi techniques may by used to provide an angle of arrival (AoA) estimate as well as range measurements.

This information may be used to provide an autofocus capability on a digital camera. For example, a digital camera may be equipped with Wi-Fi, for example, wireless device 202. The Wi-Fi equipped digital camera may be configured to use a Wi-Fi protocol for example, IEEE 802.11mc. Using such a protocol, the digital camera may be able to identify and connect to other wireless devices. These other wireless device may include, for example, mobile phones, smart watches, and other portable devices.

Accordingly, a digital camera may be configured to connect to and identify other wireless devices, using a Wi-Fi protocol, for example, a peer-to-peer Wi-Fi protocol. The digital camera may be aware of certain other devices, for example, devices owned by friends and family of the owner of the digital camera, which might be configured to connect to the digital camera using W-Fi. Based on this connection, a digital camera may be configured to determine a distance (and even a direction) to another device. This distance may then be used to provide autofocus capability for the digital camera, in order to focus on one or more distance at which another device is located. For example, this distance may be determined by, for example, comparing a time included in a transmission (for example, a timestamp) to a time of the reception of that transmission.

Using Wi-Fi ranging for auto-focus may have many advantages over traditional techniques. One problem with both active and passive autofocus techniques may be that it is difficult to focus on the correct object in a crowded scene. For example, a parent may take a digital camera to a child's soccer game. During this soccer game, there may be a large number of players on the field, and they may be at different distances from each other. A parent may wish, however, to focus the camera on their child, rather than the other children who are playing the game. In a busy scene with moving subjects, it may be very difficult to use an autofocus to focus on one particular child. The child can wear a Wi-Fi equipped watch, phone, communication device, article or clothing. A Wi-Fi equipped camera may be configured to connect to the child's Wi-Fi device, to recognize that device as being the child's device, and to determine a distance between the camera and that child's device. The camera may then be configured to adjust an autofocus in order to focus on objects which are at the distance of the child's device. Accordingly, this technique may allow autofocus to be used in order to focus on a particular person, despite a crowded scene.

Figure 3A:
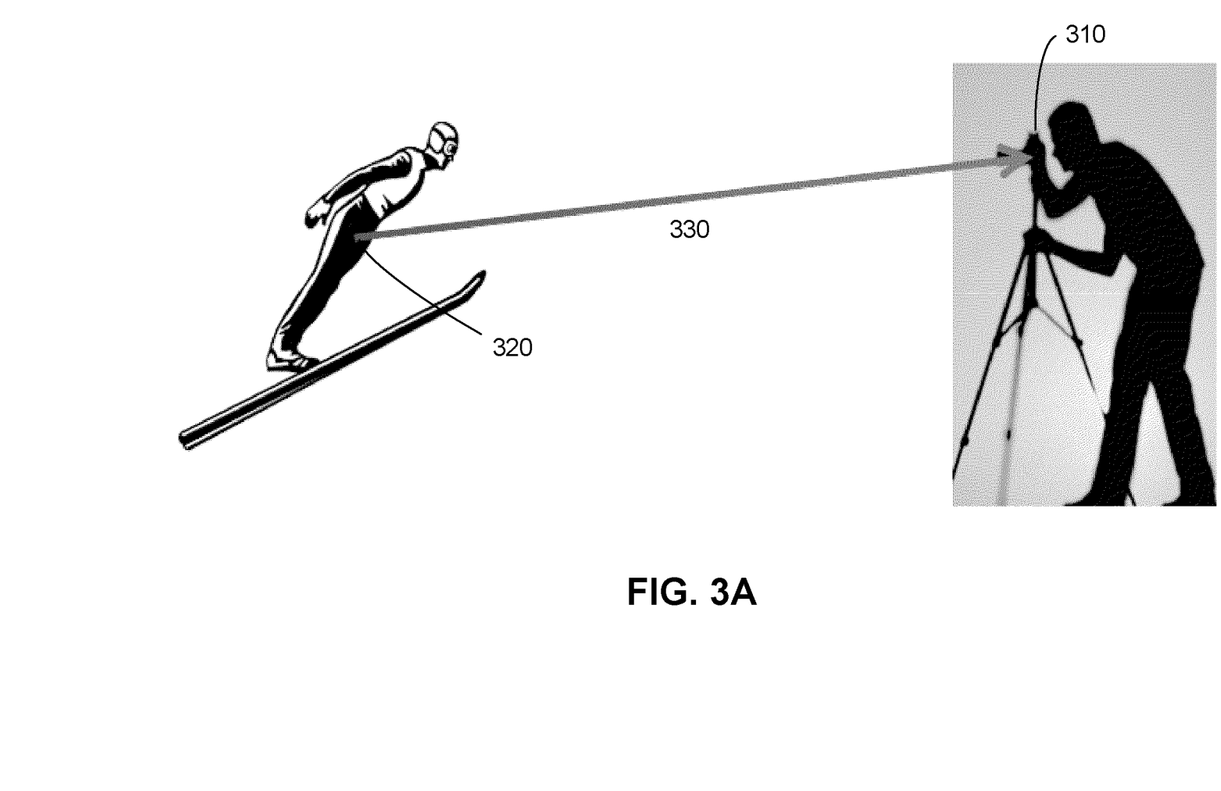
FIG. 3A is an illustration of a method of using Wi-Fi to provide an autofocus capability for a camera.

FIG. 3A is an illustration of a method of using Wi-Fi to provide an autofocus capability for a camera. First, the subject may have a smart phone or wearable device 320 which may be compatible with Wi-Fi ranging. For example, the subject may have a device 320 which is compatible with IEEE 802.11mc, or another similarly-capable Wi-Fi protocol.

The photographer, similarly, may have a smart phone or a DSLR camera 310 which can also use Wi-Fi ranging, for example, being compatible with IEEE 802.11mc, or another similarly-capable Wi-Fi protocol. A peer discovery process may be used in order to allow the camera 310 and the subject's device 320 to identify each other via Wi-Fi. Such a protocol may, for example, allow the devices to discover and communicate with each other using peer-to-peer Wi-Fi techniques. For example, as illustrated, the subject's device 320 may transmit one or more messages 330 to the camera 310, and these messages 330 may allow the camera 310 to determine a distance between the camera 310 and the subject's device 320 using Wi-Fi ranging.

Once the camera 310 and the subject's device 320 have identified and connected to one another using a peer-to-peer Wi-Fi protocol, Wi-Fi ranging may be used to get a distance between the camera 310 and the subject's device 320. As indicated above, the precision of this distance may depend, at least in part, on an available bandwidth in the network. For example, in some aspects, the distance between the camera and the subject may be determined with a precision of up to about 1 meter.

After determining a distance between the camera 310 and the subject's device 320, the camera 310 may be autofocused based upon this distance. In some aspects, the camera 310 may be aware of two or more subjects. The camera 310 may be configured to focus on more than one object, accordingly. In some aspects, the camera 310 may also determine a direction to each of one or more objects. The camera 310 may also be configured to determine a direction that the camera 310 is pointed in. For example, the camera 310 may be configured to determine if a particular nearby device is within the field of view of the camera 310. Thus, if that device is not in the field of view of the camera 310, the camera 310 may not adjust focus based on that object. In some aspects, Wi-Fi based autofocus may be used in conjunction with other methods for focusing a camera 310 as well. For example, this autofocus may be adjusted using another method, for example, using two imaging sensors to determine depth information or processes that detect and minimize blurriness. The focus of the camera 310 may also be adjusted manually, after the autofocus has focused on an object.

After the autofocus has been focused on the one or more objects in the image, the camera 310 may be used to take a camera shot or a video. One advantage of this method of autofocus may be the ability to continuously keep an object in focus based on its distance, regardless of whether it becomes partially or fully temporarily obscured by other objects. For example, a parent may wish to record a child's soccer game, and may wish for the child to remain in focus even when other players temporarily pass in from of the child. Such a busy scene may be very difficult for other methods of autofocus, in order to remain focused on the proper player in a busy scene.

This approach may have other advantages as well. For example, Wi-Fi is widely available across smartphones and other wearable devices. Accordingly, this approach may not require any extra equipment in order to provide autofocus functionality. Further, a camera may use preconfigured information, for example, other information about a subject, including height, age, skin color, preference, and so on. This information may also be embedded in the photo shooting process to improve the shooting experience and result. The Wi-Fi approach may also get distances for multiple subjects more efficiently than other approaches. For example, in a family, multiple children may have wearable devices communication to the camera (for example, a smartphone with Wi-Fi and camera functionality). The camera may then have a better knowledge about the subjects which are of interest, and may shoot photographs accordingly. Wi-Fi ranging may also be advantageous in crowded places and in situations where continuous shooting is desired, for example, when shooting a video. For example, in a child's soccer game, the child may be frequently occluded by other players. Using other auto-focus methods, the camera may adjust its focus to focus on the other players, and be unable to maintain focus on the desired subject. However, with Wi-Fi technology, it may be possible to remain focused on the desired subject even in such a situation.

In some aspects, there may also be difficulties that may be worked around using Wi-Fi ranging. For example, Wi-Fi of various devices may also be on. Accordingly, a camera may be aware of devices which are nearby even when those devices are not in the field of view of the camera. Generally, range measurements may be combined with angle or arrival measurements, in order to determine an angle at which a subject is from the camera. Additionally, one may use Wi-Fi based ranging and angle of arrival (AoA) measurement with other readings, for example, GPS information at both devices in order to further obtain a relative vector location between the camera and the possible subject. A camera may determine whether a possible subject is in the field of view of the camera (and thus, whether to adjust a focus based on this subject) based at least in part on this information. Further, the Wi-Fi approach may also be configured to work with face recognition to automatically identify if a current distance measurement is valid or not. For example, this may help a device to identify whether a subject associated with a particular device is in the frame or not. Further, a user may also be able to turn off Wi-Fi ranging when it is not desired.

In some aspects, it may also be confusing for a user when multiple people with different Wi-Fi enabled devices are within an effective range of the camera. Accordingly, a preconfiguration may be needed, in order to configure the camera to be aware of which other devices belong to friends or family. This configuration or registration may help to identify the desired subjects during photo shooting. A camera may be configured to remember which other devices below to known individuals, in order to be able to identify those individuals in the future. Further, Wi-Fi autofocus may be disabled or overridden by a user when an object of a photo is not either a family member or a close friend, and thus, when Wi-Fi ranging may not be appropriate. For example, Wi-Fi ranging may not be desired at a sporting event or in other situations where a user may be near a number of other devices, but may be taking an image of things other than the nearby potential subjects.

Figure 3B:
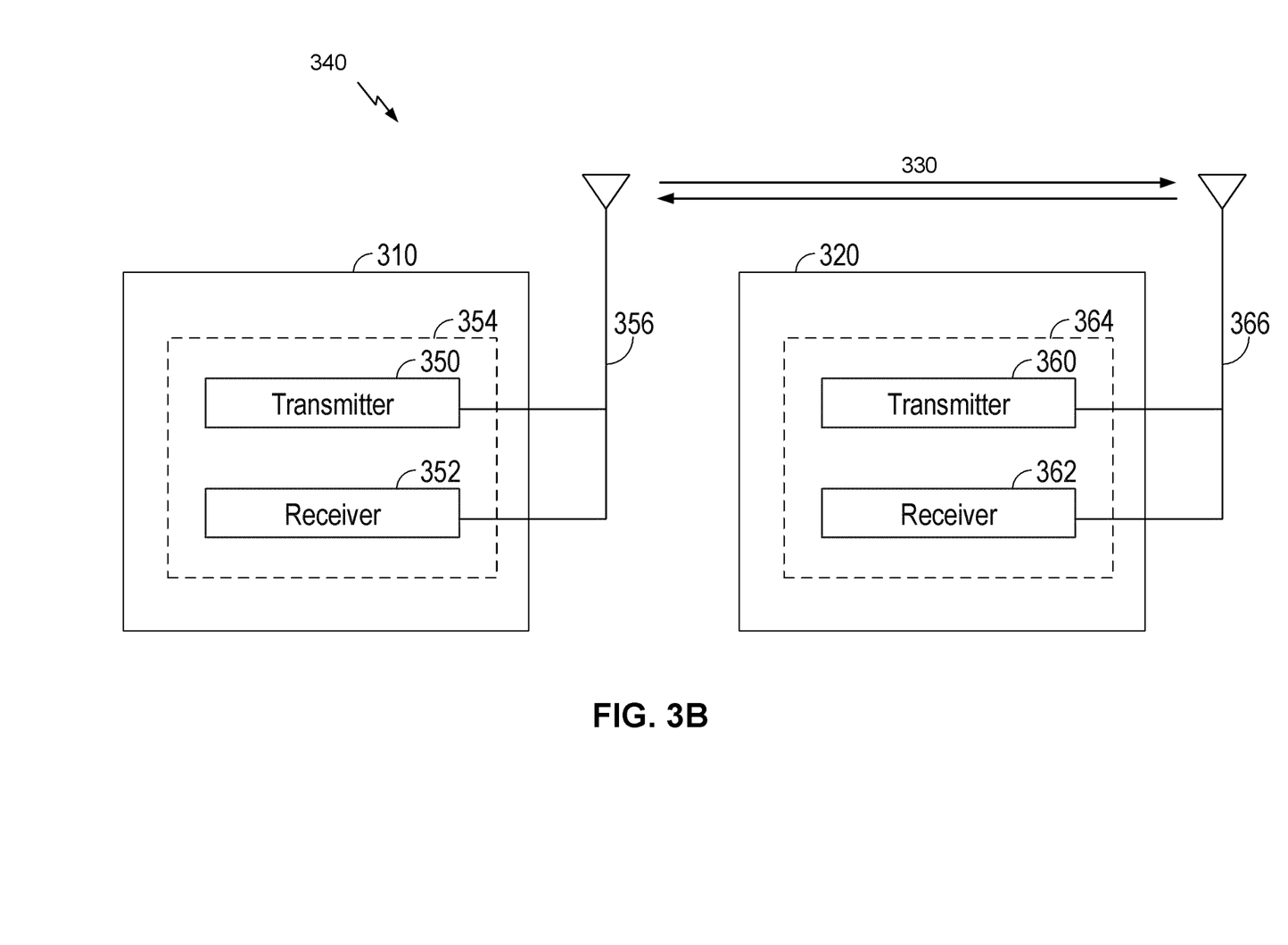
FIG. 3B is an illustration of a camera and a subject's device communicating with each other, according to some aspects of the present disclosure

FIG. 3B is an illustration 340 of a camera 310 and a subject's device 320 communicating 330 with each other, according to some aspects of the present disclosure. The camera 310 may include a number of different components, including many components in addition to the illustrated components. For example, the camera 310 may include camera components, processing components, and other components that would be expected in a digital SLR camera or in a mobile phone. The camera 310 may also include, at least, a transmitter 350 and a receiver 352, which may optionally be combined into a transceiver 354. The transmitter 350 and the receiver 352, and/or the transceiver 354 may be operably connected to an antenna 356. Accordingly, the camera 310 may be configured to transmit and receive messages using the antenna 356. These messages may include, for example, Wi-Fi communications using one or more IEEE 802.11-family standards.

Similarly, the subject may be wearing a device 320. This device 320 may include, for example, a mobile phone, a Wi-Fi-equipped watched, or another Wi-Fi device. This device 320 may be on the person of the subject, such that the device 320 and the subject may be a similar distance and direction from the camera 310. The device 320 may include, at least, a transmitter 360 and a receiver 362, which may optionally be combined into a transceiver 364. The transmitter 360 and the receiver 362, and/or the transceiver 364 may be operably connected to an antenna 366. Accordingly, the device 320 may be configured to transmit and receive messages using the antenna 366. These messages may include, for example, Wi-Fi communications using one or more IEEE 802.11-family standards. The device 320 may also include a number of other components, depending upon the type of device that it is. For example, the device 320 may further include components such as a processor, a screen, and memory. For example, device 320 may include the components described as being contained within wireless device 202.

As illustrated in illustration 340, the camera 310 and the device 320 may communicate 330 with each other. These communications may be communications using an IEEE 802.11-family protocol, such as IEEE 802.11mc. These communications may be, for example, peer-to-peer transmissions which are communicated directly from camera 310 to device 320, or vice versa, rather than transmissions which travel through an AP 104 (FIG. 1). Based upon these communications 330, camera 310 may be configured to determine a distance between itself and device 320. For example, certain communications 330 may contain information, such as a time-stamp, which may be used to determine how long the communication 330 took to arrive, which may be used to derive a distance between the device 320 and the camera 310. Communications 330 may also include information such as a signal strength. For example, it may be possible to estimate a distance between the device 320 and the camera 310 based upon a known transmission signal strength (at the time it was transmitted) compared to a received signal strength, along with information such as known dissipation rates of signal strength compared to distance. Thus, signal strength information may be beneficial for use in inferring a distance of a communication 330 between the camera 310 and the device 320. After a distance between the camera 310 and the device 320 is determined, using the above techniques or using other Wi-Fi-based techniques, a focus of the camera 310 may then be adjusted.

Figure 4:
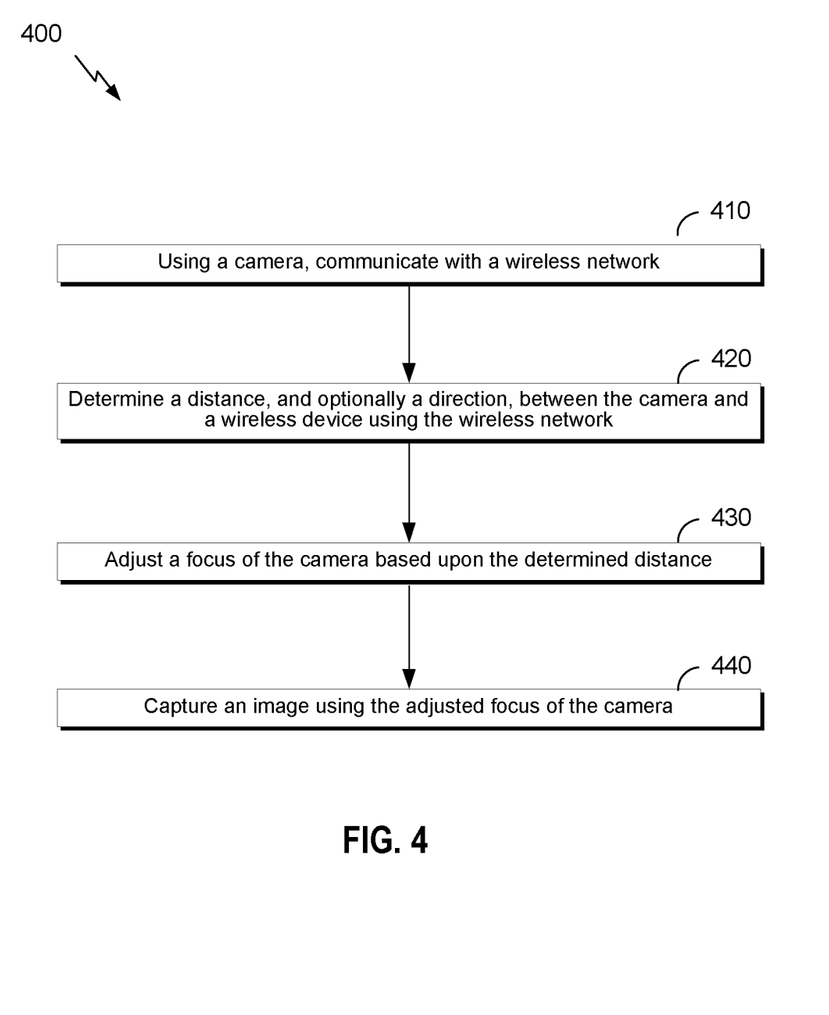
FIG. 4 is an illustration of an exemplary method of capturing an image using wireless ranging according to certain aspects of the present disclosure.

FIG. 4 is an illustration of an exemplary method 400 of capturing an image using wireless ranging according to certain aspects of the present disclosure. In some aspects, this method may be done by a device which includes both a digital camera and wireless communications capabilities. For example, this may include a smartphone or a digital camera, for example, a digital single-lens reflex camera, with wireless communications capabilities.

At block 410, the method includes using a camera to communicate with a wireless network. For example, the camera may be configured to use an IEEE 802.11 standard, for example, IEEE 802.11mc. In some aspects, the wireless device may include another IEEE 802.11-compliant device, and may be found on the person of a potential subject for an image. For example, the wireless device may be a smartphone or a wearable device, for example, a watch. The wireless device may be owned or carried by an individual who is known to the owner of the camera. For example, the camera may be configured to identify and recognize a number of wireless devices which are carried by individuals known to the owner of the camera. A camera may know wireless devices which are worn by children in a family, for example. Accordingly, the camera may be configured to scan for known wireless devices within the proximity of the camera, to identify those wireless devices, and to communicate with the identified, recognized devices. In some aspects, the means for communicating with a wireless device may include a transmitter, a receiver, a transceiver, and/or a processor. In some aspects, the wireless network may be a global positioning system (GPS) network. Accordingly, the wireless device may be a GPS-enabled device, and the camera may be a GPS-enabled device as well. Accordingly, the camera may be configured to determine a distance between a GPS location of the camera and a GPS location of the wireless device.

At block 420, the method includes determining a distance, and optionally a direction, between the camera and a wireless device using the wireless network. For example, the IEEE 802.11mc standard may include a number of functions, including an ability to determine a distance and/or a direction to another wireless communication device. Thus, such a technique may be used to determine a distance between the camera and another wireless device, for example, a device which is carried by a possible subject of a photograph, for example, a family member or friend. In some aspects, the distance and direction may be used to determine if a subject may be within the field of view of the camera. For example, the direction of a subject may be compared to a direction the camera is facing, in order to determine if the camera may be pointed at the potential subject. In some aspects, the means for determining a distance and/or a direction may include a transmitter, a receiver, a transceiver, and/or a processor.

For example, a wireless device may be configured to determine its own location via GPS. The wireless device may be further configured to communicate this location with the camera. For example, the camera and the wireless device may be configured to communicate with each other using an IEEE 802.11 standard, or using another wireless communication network, such as a cellular network (such as a 4G cellular network) or Bluetooth. Using this wireless communication network, the wireless device may inform the camera of the location of the wireless device. For example, the wireless device may be able to use its own GPS system to accurately determine its own location. This location may be stated in terms of certain parameters, such as by specifying a longitude and a latitude of the device. This location may be determined to a high degree of accuracy. The wireless device may be configured to transmit its location to the camera, either automatically or on a regular interval, or to transmit its location to the camera at specific times when the camera requests the location of the wireless device.

Similarly, the camera may also have a GPS system, and may be configured to determine its own location to a high degree of accuracy using the GPS system. The camera may be further configured to receive a GPS location from one or more wireless devices. These GPS locations may be received over any type of connection to the wireless device, including an IEEE 802.11-based connection, a cellular connection, or Bluetooth. The camera may be configured to request a GPS location from the wireless device, or to receive a periodically-transmitted location from the wireless device. In some aspects, the camera may be configured to request that the wireless device periodically transmit its location to the camera for a certain period of time, such as when the camera is near the wireless device and the camera is in use.

The camera may then be configured to determine its own GPS location, and to compare the GPS locations of the wireless device and of the camera to determine a distance between the wireless device and the camera. In some aspects, these GPS locations may also be used to determine a direction between the camera and the wireless device. Other methods of using GPS locations may also be possible. For example, GPS locations may be used in conjunction with Wi-Fi-based techniques for determining a distance, such as to refine a distance determination.

At block 430, the method includes adjusting a focus of the camera based upon the determined distance. For example, the determined distance may be a distance, in meters. This distance may be precise to approximately one meter. This precision may vary, either to be better or worse, based on the technology used to determine the distance, and a bandwidth of the wireless communication. For example, when more bandwidth is available, the precision of the distance determination may be increased. In some aspects, adjusting the focus may include determining if a given device is within the field of view of the camera. For example, a distance and a direction to a device may be determined, and based on this, the camera may determine whether or not the device is in a field of view of the camera. In some aspects, multiple devices may be near the camera, and this may be repeated for each device. In some aspects, adjusting the focus of the camera may include adjusting lens and other settings within the camera, in order to bring objects a certain distance away from the camera into focus. The means for adjusting a focus of the camera may include a processor.

At block 440, the method includes capturing an image using the adjusted focus of the camera. For example, the focus may be adjusted in order to focus on one or more subjects, based on Wi-Fi ranging, above. Accordingly, the camera may be configured to capture an image using this adjusted focus. In some aspects, capturing an image may include capturing a plurality of images, for example, in a video. Certain aspects of the present disclosure may be conducive to capturing video, and enabling the subject of the video to remain in focus. In certain aspects, when capturing a video, a distance may be determined throughout the video, in order to maintain a focus on the subject of the image. In some aspects, the means for capturing an image and the means for capturing a video may include a processor and/or a camera.

In some aspects, the method may include determining a direction from the camera to the wireless device, using the wireless communication network. The means for determining a direction may include a processor. In some aspects, the method may also include determining if the wireless device is within a field of view of the camera, based at least on the determined direction. In some aspects, the means for determining if the wireless device is within a field of view of the camera may include a processor.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, for example, various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies for example, infrared, radio, and microwave, then the coaxial cable, fiber optic cable, twisted pair, DSL, or wireless technologies for example, infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium for example, a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of capturing an image using automatic focus, the method comprising:
receiving, by a camera device, a transmission from a wireless device over a wireless network, the transmission including time information indicating when the transmission was sent;
determining a distance between the camera device and the wireless device based on comparing the time information included in the received transmission to a time when the transmission was received at the camera device;
adjusting a focus of a camera of the camera device based on the determined distance; and
capturing an image using the adjusted focus of the camera.

2. The method of claim 1, wherein determining the distance between the camera device and the wireless device further comprises using a global positioning system location of the camera and a global positioning system location of the wireless device.

3. The method of claim 2, further comprising receiving by the camera a global positioning system location of the wireless device.

4. The method of claim 3, wherein the wireless network is one of an IEEE 802.11-based network, a cellular network, or a Bluetooth network.

5. The method of claim 2, further comprising requesting, using the camera device, a global positioning system location from the wireless device over the wireless network.

6. The method of claim 1, wherein the wireless network comprises a network operating under one or more IEEE 802.11 standard.

7. The method of claim 1, wherein the wireless network comprises a peer-to-peer wireless network, and where communicating with a wireless network comprises communicating with the wireless device via the peer-to-peer wireless network.

8. The method of claim 1, wherein the wireless device comprises a mobile device worn by a person that is a subject of the image.

9. The method of claim 1, further comprising:
   determining a direction from the camera to the wireless device, using the wireless network; and
   determining if the wireless device is within a field of view of the camera, based at least on the determined direction.

10. The method of claim 1, wherein determining a distance between the camera device and the wireless device comprises determining a distance between the camera device and the wireless device to a precision of about one meter.

11. The method of claim 1, wherein capturing an image using the adjusted focus of the camera comprises capturing a video, comprising a plurality of images, using the adjusted focus of the camera.

12. The method of claim 1, wherein the time information comprises a time stamp.

13. An apparatus for capturing an image using an automatic focus, comprising:
   a camera configured to capture one or more images; and
   a processing system configured to:
      communicate with a wireless network to receive a transmission from a wireless device, the transmission including time information indicating when the transmission was sent;
      determine a distance between the camera and the wireless device by comparing the time information to a time when the transmission was received at the processing system; and
      adjust a focus of the camera based on the determined distance.

14. The apparatus of claim 13, wherein the wireless network is one of an IEEE 802.11-based network, a cellular network, or a Bluetooth network.

15. The apparatus of claim 13, wherein the wireless network comprises a peer-to-peer wireless communication network, and wherein the processing system is further configured to communicate with the wireless device via the peer-to-peer wireless network.

16. The apparatus of claim 13, wherein the wireless device comprises a mobile device worn by a person that is a subject of the image.

17. The apparatus of claim 13, wherein the processing system is further configured to request a global positioning system location from the wireless device over the wireless network.

18. The apparatus of claim 13, wherein the processing system is further configured to:
   determine a direction from the camera to the wireless device, using the wireless network; and
   determine if the wireless device is within a field of view of the camera, based at least on the determined direction.

19. The apparatus of claim 13, wherein the processing system is further configured to determine the distance between the camera and the wireless device to a precision of about one meter.

20. The apparatus of claim 13, wherein the camera is further configured to image capture video using the adjusted focus.

21. An apparatus, comprising:
   means for capturing an image;
   means for communicating with a wireless device via a wireless network to receive a transmission from the wireless device at the means for communicating, the transmission including time information indicating when the transmission was sent;
   means for determining a distance between the image capturing means and the wireless device by comparing the time information to a time the transmission was received at the communication means; and
   means for adjusting focus of the image capturing means based at least in part on the determined distance.

22. The apparatus of claim 21, wherein the wireless network is one of an IEEE 802.11-based network, a cellular network, or a Bluetooth network.

23. The apparatus of claim 21, wherein the wireless network comprises a peer-to-peer wireless network.

24. The apparatus of claim 21, wherein the means for determining a distance determines the distance between the image capturing means and the wireless device based in part on a received global positioning system location.

25. The apparatus of claim 21, further comprising:
   means for determining a direction from the image capturing means to the wireless device, using the wireless network; and
   means for determining if the wireless device is within a field of view of the image capturing means, based at least on the determined direction.

26. The apparatus of claim 24, wherein the means for determining a distance is further configured to determine a distance between, the image capturing means and the wireless device to a precision of about 1 meter.

27. The apparatus of claim 21, wherein the image capturing means comprises a camera, and wherein the communicating means comprises a transceiver.

28. A non-transitory computer-readable medium comprising code that, when executed, causes an apparatus to:
   receive, by a camera device, a transmission from a wireless device over a wireless network, the transmission including time information indicating when the transmission was sent;
   determine a distance between the camera device and the wireless device by comparing the time information to a time when the transmission was received at the camera device;
   adjust a focus of a camera of the camera device based upon the determined distance; and
   capture an image using the adjusted focus of the camera.

29. The non-transitory computer-readable medium of claim 28, further comprising code that when executed, causes an apparatus to determine the distance between the camera device and the wireless device based on, at least in part, a global positioning system location of the camera and a global positioning system location of the wireless device.

30. The non-transitory computer-readable medium of claim 28, further comprising code that, when executed, causes an apparatus to:
- determine a direction from the camera to the wireless device, using the wireless network; and
- determine if the wireless device is within a field of view of the camera, based at least on the determined direction.

* * * * *